(12) United States Patent
Lee et al.

(10) Patent No.: US 8,779,314 B2
(45) Date of Patent: Jul. 15, 2014

(54) BUTTON MECHANISM AND ELECTRONIC DEVICE THEREWITH

(75) Inventors: Hsin-Chun Lee, New Taipei (TW); Chin-Li Huang, New Taipei (TW); Nien-An Lai, New Taipei (TW); Yu-Ling Kuo, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 191 days.

(21) Appl. No.: 13/292,092

(22) Filed: Nov. 9, 2011

(65) Prior Publication Data
US 2012/0138444 A1 Jun. 7, 2012

(30) Foreign Application Priority Data
Dec. 1, 2010 (TW) ................ 99223310 U

(51) Int. Cl.
*H01H 13/02* (2006.01)
(52) U.S. Cl.
USPC ............ 200/530; 200/243; 200/520
(58) Field of Classification Search
CPC .................................... H01H 13/14
See application file for complete search history.

(56) References Cited

U.S. PATENT DOCUMENTS

| 5,605,223 A * | 2/1997 | Gutmann et al. ............ 200/275 |
| 5,743,386 A * | 4/1998 | Liao .............................. 200/512 |
| 6,644,822 B2 * | 11/2003 | Kumagai ....................... 362/26 |

* cited by examiner

*Primary Examiner* — Renee Luebke
*Assistant Examiner* — Ahmed Saeed
(74) *Attorney, Agent, or Firm* — Winston Hsu; Scott Margo

(57) ABSTRACT

A button mechanism includes a circuit structure and an actuating structure. The circuit structure includes a substrate, a first electrode layer, and a second electrode layer. The first electrode layer and the second electrode layer are disposed on the substrate, and the second electrode layer is separated from the first electrode layer. The first electrode layer includes a first section and a second section. The second electrode layer includes a third section and a fourth section. The second section stretches to the third section, and the fourth section stretches to the first section. A predetermined gap is formed between the first electrode layer and the second electrode layer, and the predetermined gap includes a plurality of curved portions. The actuating structure includes a conductive portion for conducting the first electrode layer and the second electrode layer.

18 Claims, 6 Drawing Sheets

BUTTON MECHANISM AND ELECTRONIC DEVICE THEREWITH

BACKGROUND OF THE INVENTION

1. Field of the Invention

The present invention relates to a button structure, and more particularly, to a button structure having small volume and utilizing an actuating structure to trigger a plurality of electrode layers and an electronic device therewith.

2. Description of the Prior Art

Please refer to FIG. 1. FIG. 1 is a diagram of a button mechanism in the prior art. A button mechanism 10 includes a circuit structure 12 and an actuating structure 14. The circuit structure 12 includes a substrate 16 and two U-typed electrode layers 18. The U-typed electrode layers 18 are alternately disposed on the substrate 16. A predetermined interval is formed between the two U-typed electrode layers 18 for preventing signal interference due to close distance of the two U-typed electrode layers 18. The actuating structure 14 is for contacting with the U-typed electrode layers 18 simultaneously, so as to electrically connect the two electrode layers.

For conforming to design specification and reliability test of the button structure 10, the conventional button structure 10 has large volume, so that it is difficult to arrange position and number of the button structure in limited mechanical space of the electronic device. In addition, the button structure 10 has an indicating function by emitting light, which occupies the mechanical space of the electronic device. Thus, design of the button structure having small dimension and preferable reliability is an important issue of the button mechanism.

SUMMARY OF THE INVENTION

An objective of the present invention is to provide a button mechanism utilizing an actuating structure to trigger a plurality of electrode layers, and the button mechanism has small dimension and preferable reliability.

Another objective of the present invention is to provide an electronic device. The electronic device has the button mechanism utilizing an actuating structure to trigger a plurality of electrode layers, and the button mechanism has small dimension and preferable reliability.

In order to achieve the foregoing objectives of the invention, the button mechanism includes a circuit structure and an actuating structure. The circuit structure includes a substrate, a first electrode layer and a second electrode layer. The first electrode layer and the second electrode layer are disposed on the substrate, and the second electrode layer separates from the first electrode layer. The first electrode layer includes a first section, and a second section connected to the first section. The second electrode layer includes a third section, and a fourth section connected to the third section. The second section points to the third section, and the fourth section points to the first section. A predetermined interval is formed between the first electrode layer and the second electrode layer, and the predetermined interval includes a plurality of turning portions. The actuating structure includes a conductive portion, and the conductive portion is for contacting the first electrode layer and the second electrode layer so as to electrically connect the first electrode layer to the second electrode layer.

According to the claimed invention, the plurality of turning portions has two turning portions.

According to the claimed invention, a width of the predetermined interval is substantially between 0.1 mm and 0.4 mm.

According to the claimed invention, the first section is substantially perpendicular to the second section, and the turning portion is a right-angle turning portion.

According to the claimed invention, the first section and the second section of the first electrode layer are arc electrode layers, and the turning portion is an arc turning portion.

According to the claimed invention, the first electrode layer further includes a fifth section, the fifth section points to the fourth section, the second electrode layer further includes a sixth section, and the sixth section points to the second section.

In order to achieve the foregoing objectives of the invention, the electronic device includes a casing, a button mechanism and at least one lighting unit. The button mechanism is disposed inside the casing. The at least one lighting unit is disposed on the substrate, and the at least one lighting unit emits light toward the actuating structure. The button mechanism includes a circuit structure and an actuating structure. The circuit structure includes a substrate, a first electrode layer and a second electrode layer. The first electrode layer and the second electrode layer are disposed on the substrate, and the second electrode layer separates from the first electrode layer. The first electrode layer includes a first section, and a second section connected to the first section. The second electrode layer includes a third section, and a fourth section connected to the third section. The second section points to the third section, and the fourth section points to the first section. A predetermined interval is formed between the first electrode layer and the second electrode layer, and the predetermined interval includes a plurality of turning portions. The actuating structure includes a conductive portion, and the conductive portion is for contacting the first electrode layer and the second electrode layer so as to electrically connect the first electrode layer to the second electrode layer.

According to the claimed invention, the actuating structure further includes at least one light guiding portion, and the at least one light guiding portion guides light emitted from the at least one lighting unit.

According to the claimed invention, the at least one lighting unit has two lighting units, the at least one light guiding portion has two light guiding portions, and the two light guiding portions respectively guide light emitted from the two lighting units.

The button mechanism and the electronic device of the present invention not only economizes disposal space of the substrate, but also conforms to design specification of the button mechanism, so that the actuating structure and the two electrode layers of the button mechanism can have effective contacting areas for decreasing contact impedance and for preferable conductive reliability. In addition, no matter where the actuating structure is pressed, the conducting portion can be electrically connected to the first electrode layer and the second electrode layer. Thus, the button mechanism of the present invention can be applied to the electronic product with a small size for preferable durability.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
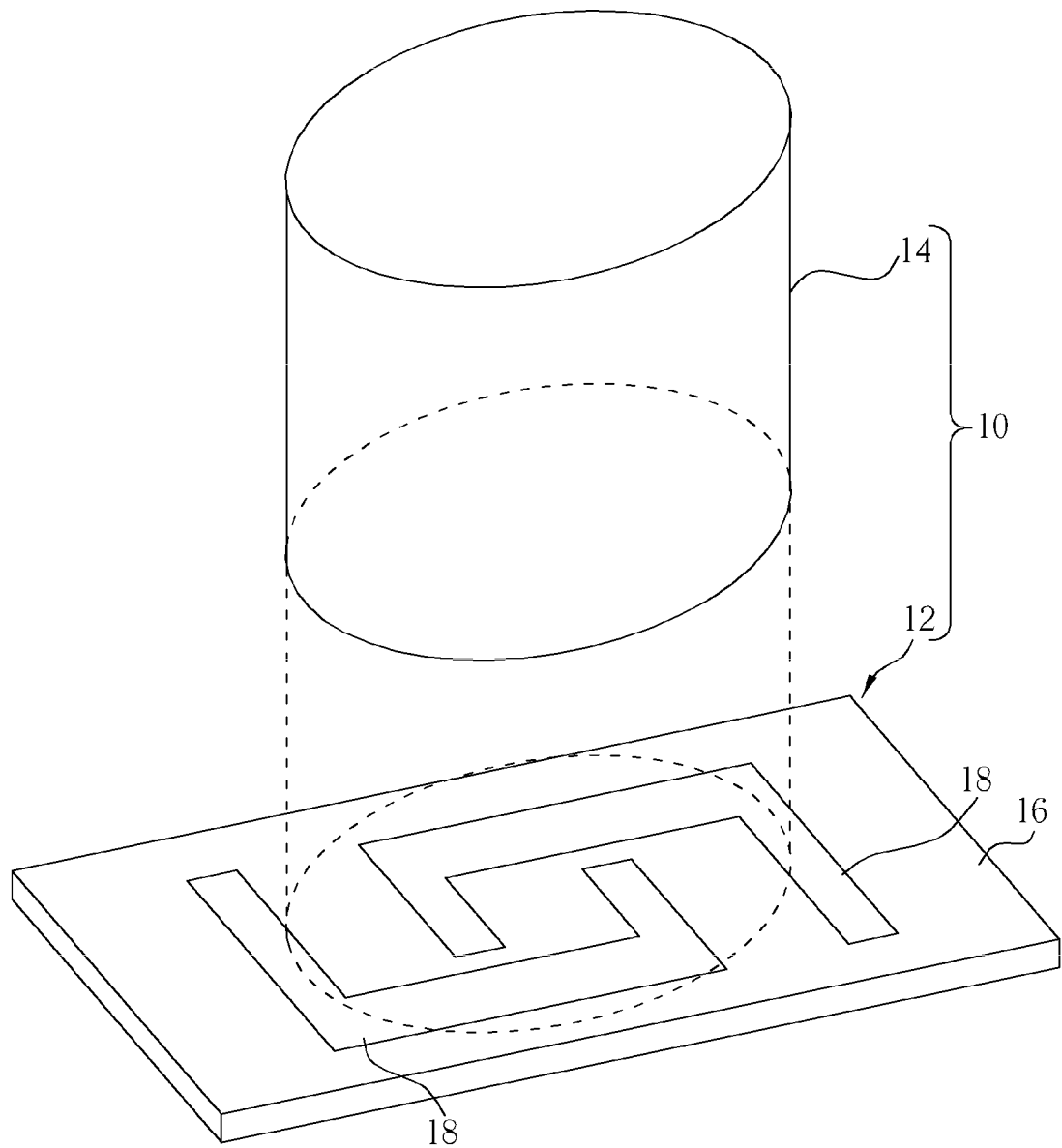
FIG. 1 is a diagram of a button mechanism in the prior art.
Figure 2:
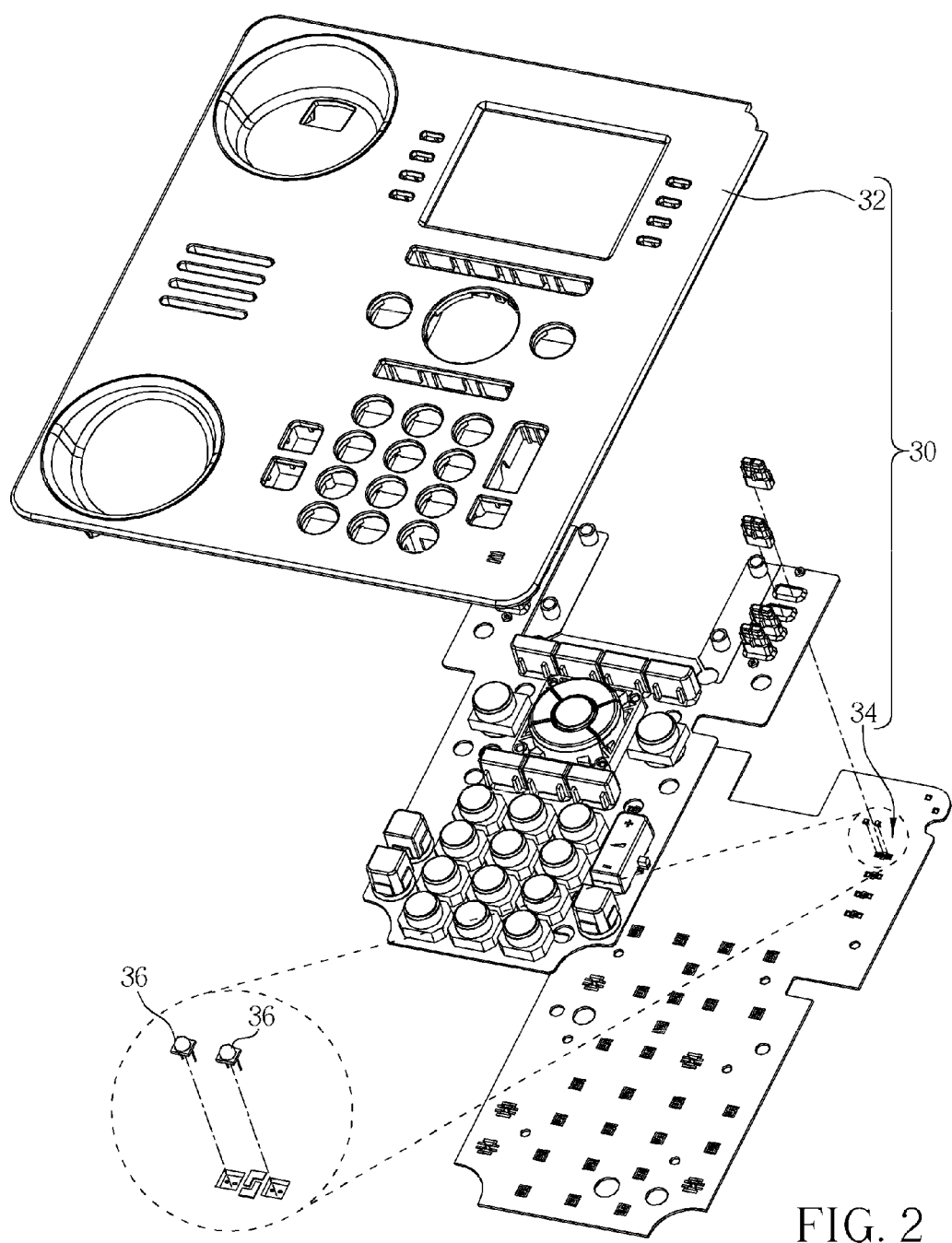
FIG. 2 is an exploded diagram of an electronic device according to a first embodiment of the present invention.

Please refer to FIG. 2. FIG. 2 is an exploded diagram of the electronic device according to a first embodiment of the present invention. For example, the electronic device 30 can be a VOIP telephone, a mobile phone, a personal digital assistant (PDA), a notebook computer, and so on. The electronic device 30 includes a casing 32, a button mechanism 34, and at least one lighting unit 36. The button mechanism 34 is disposed inside the casing 32, and the lighting unit 36 is disposed adjacent to the button mechanism 34. The lighting unit 36 emits light corresponding to operation modes of the button mechanism 34. For example, the lighting unit 36 emits green light when the telephone is available, and the lighting unit 36 emits red light when the telephone is busy. In the embodiment, the lighting unit 36 can be a light emitting diode (LED), and there are two lighting units 36.

Figure 3:
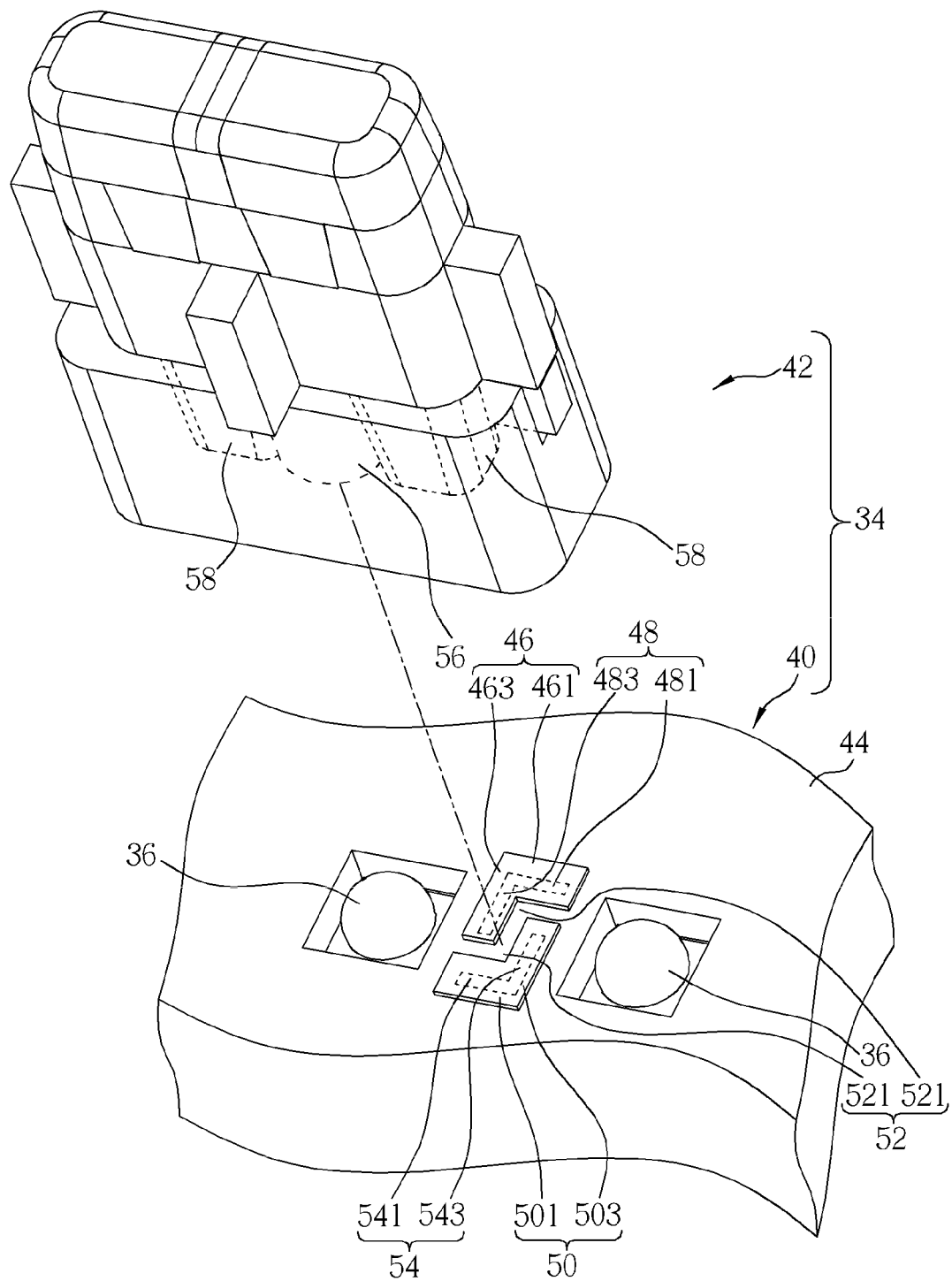
FIG. 3 is a diagram of the button mechanism according to the first embodiment of the present invention.

Please refer to FIG. 3. FIG. 3 is a diagram of the button mechanism 34 according to the first embodiment of the present invention. The button mechanism 34 includes a circuit structure 40 and an actuating structure 42. The actuating structure 42 is movably disposed on the circuit structure 40, and a part of the actuating structure 42 protrudes out of the casing 32.

The circuit structure 40 includes a substrate 44, a first electrode layer 46, and a second electrode layer 50. The first electrode layer 46 and the second electrode layer 50 are disposed on the substrate 44. The first electrode layer 46 includes a first section 461 and a second section 463, and the second section 463 is connected to the first section 461.

The second electrode layer 50 includes a third section 501 and a fourth section 503, and the fourth section 503 is connected to the third section 501. The second section 463 of the first electrode layer 46 points to the third section 501 of the second electrode layer 50, and the fourth section 503 of the second electrode layer 50 points to the first section 461 of the first electrode layer 46.

In the embodiment, the first section 461 and the second section 463 can respectively be a rectangular section, and the L-typed first electrode layer 46 is composed of the first section 461 and the second section 463. In the embodiment, a length of the first electrode layer 46 is substantially less than 3 mm, and a width of the first electrode layer 46 is substantially less than 1.5 mm.

The third section 501 and the fourth section 503 are respectively a rectangular section, and the L-typed second electrode layer 50 is composed of the third section 501 and the fourth section 503. In the embodiment, a shape of the second electrode layer 50 can be substantially symmetric to a shape of the first electrode layer 46, and dimensions of the second electrode layer 50 can be substantially identical to dimensions of the first electrode layer 46.

In the embodiment, a direction of the first section 461 is parallel to a direction of the third section 501, and directions of the second section 463 and the fourth section 503 are respectively perpendicular to directions of the first section 461 and the third section 501. An end of the second section 463 is adjacent to and does not contact the third section 501, and an end of the fourth section 503 is adjacent to and does not contact the first section 461.

The second electrode layer 50 separates from the first electrode layer 46, so that a predetermined interval 52 is formed between the first electrode layer 46 and the second electrode layer 50, and the predetermined interval 52 includes a plurality of turning portions 521. In the first embodiment, there are two turning portions 521, and the two turning portions 521 are respectively a right angle portion, substantially. In the embodiment, a width of the predetermined interval 52 is substantially between 0.1 mm and 0.4 mm for preventing signal interference, such as electromagnetic effect, and short circuit due to close distance between the first electrode layer 46 and the second electrode layer 50.

In the embodiment, the circuit structure 12 further includes a first bridging layer 48 and a second bridging layer 54. The first bridging layer 48 and the second bridging layer 54 are for enhancing adhesion of the first electrode layer 46 and the second electrode layer 50 on the substrate 44. The first bridging layer 48 includes a first part 481 and a second part 483. The first part 481 is disposed between the substrate 44 and the first section 461 of the first electrode layer 46, and the second part 483 is connected to the first part 481 and disposed between the substrate 44 and the second section 463 of the first electrode layer 46.

The second bridging layer 54 includes a third part 541 and a fourth part 543. The third part 541 is disposed between the substrate 44 and the third section 501 of the second electrode layer 50. The fourth part 543 is connected to the third part 541 and disposed between the substrate 44 and the fourth section 503 of the second electrode layer 50. The second bridging layer 54 is for enhancing adhesion of the second electrode layer 50 on the substrate 44.

For example, the substrate 44 can be a printed circuit board, the first electrode layer 46 can be made of conductive material, such as carbon ink, and the first bridging layer 48 can be made of copper metal, so that adhesion of the conductive material (carbon ink) on the printed circuit board can be enhanced via the copper metal.

In addition, a width of the first bridging layer 48 is less than the width of the first electrode layer 46, and distances between lateral sides of the first bridging layer 48 and corresponding lateral sides of the first electrode layer 46 are substantially at least 0.15 mm, so as to stably fix the first electrode layer 46 on the substrate 44 via the first bridging layer 48. Material, characteristic and dimensions of the second electrode layer 50 and the second bridging layer 54 are identical to ones of the first electrode layer 46 and the first bridging layer 48, and detailed description is omitted herein for simplicity.

The actuating structure 42 includes a conducting portion 56 and at least one light guiding portion 58. The conducting portion 56 is for contacting the first electrode layer 46 and the second electrode layer 50, so as to electrically connect the first electrode layer 46 to the second electrode layer 50 for generating the corresponding signal. In the embodiment, there are two light guiding portions 58, the two lighting units 36 are respectively disposed on two opposite sides of the first electrode layer 46 and the second layer 50 of the circuit structure 40, and the two light guiding portions 58 respectively guide light emitted from the two lighting units 36 to the casing 32 for providing indicating function of the button mechanism 34.

For installing the two lighting units 36 inside the button mechanism 34 to emit light with different colors, the lighting unit 36 of the electronic device 30 of the present invention can be a focus LED, which can emit light at a specific direction in narrow space. Light emitted from the two lighting units 36 can be guided by the two light guiding portions 58 of the actuating structure 42 of the button mechanism 34 without interference.

Figure 4:
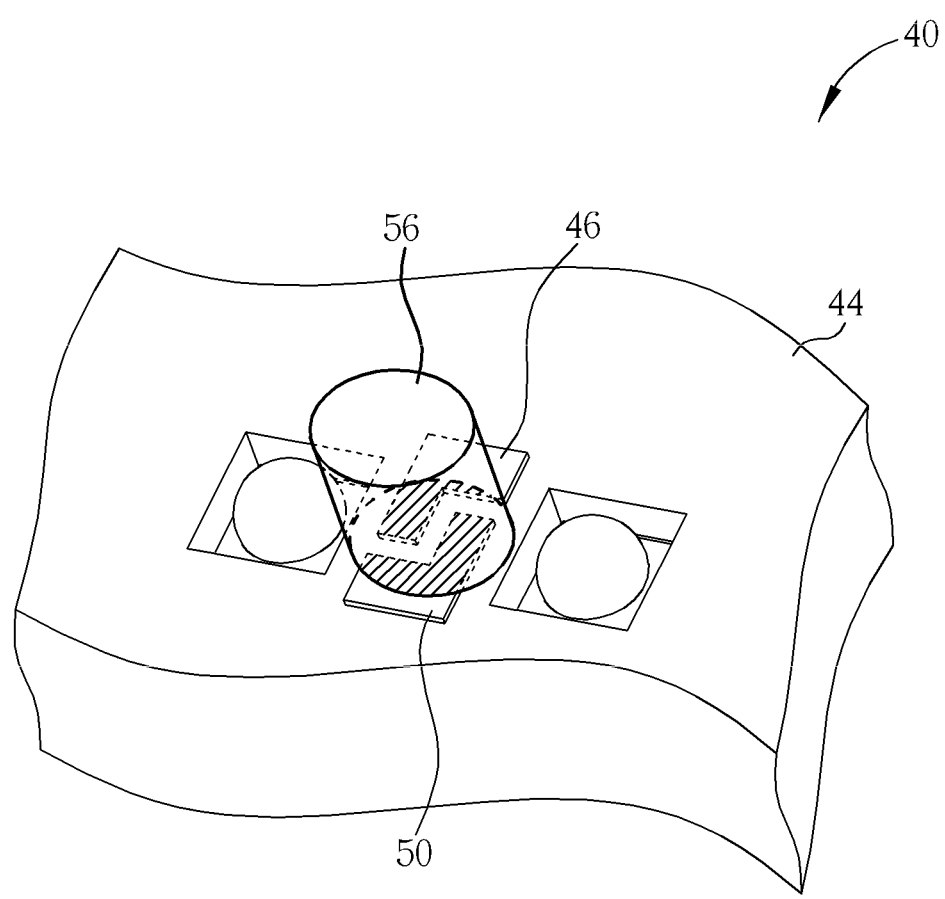
FIG. 4 is a diagram of a conducting portion contacting a first electrode layer and a second electrode layer according to the first embodiment of the present invention.

Please refer to FIG. 3 and FIG. 4. FIG. 4 is a diagram of the conducting portion 56 contacting the first electrode layer 46 and the second electrode layer 50 according to the first embodiment of the present invention. The first section 461 of the first electrode layer 46 is substantially perpendicular to the second section 463, and the third section 501 of the second electrode layer 50 is substantially perpendicular to the fourth section 503. The two turning portions 521 can respectively be a right angle turning portion.

No matter where the actuating structure 42 is pressed, the conducting portion 56 of the circuit structure 40 of the button mechanism 34 can contact the first electrode layer 46 and the second electrode layer 50 for electrical connection, so that the conducting portion 56, the first electrode layer 46 and the second electrode layer 50 of the present invention can have effective contacting areas for decreasing contact impedance and for preferable conductive reliability.

Figure 5:
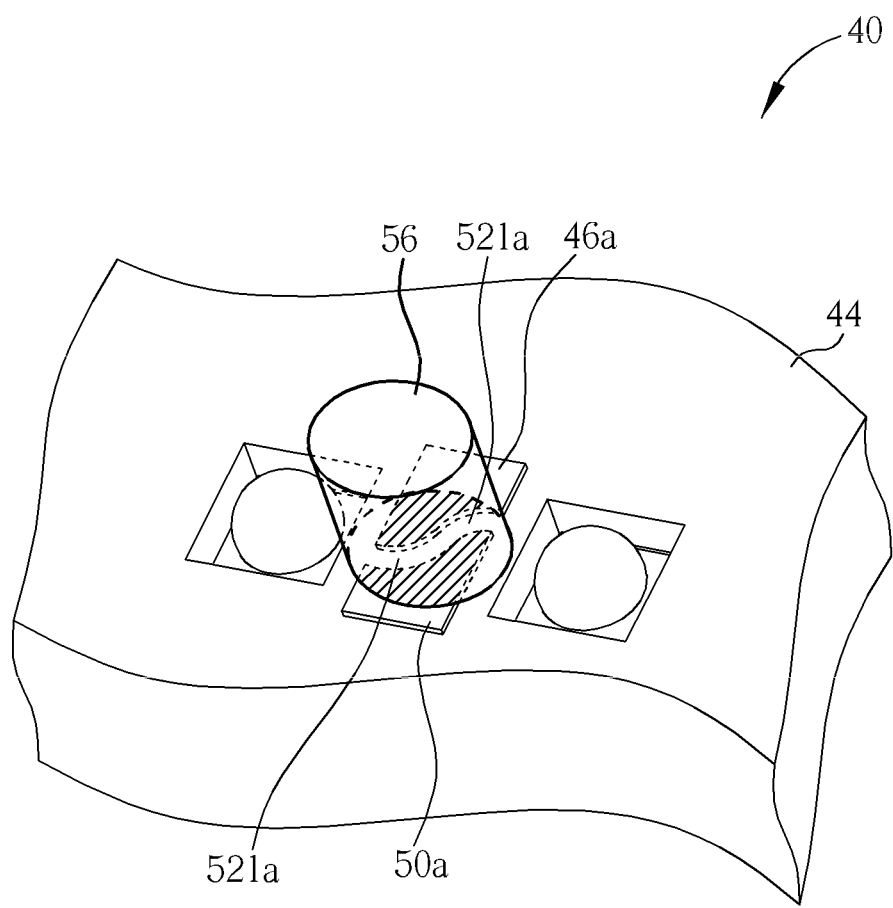
FIG. 5 is a diagram of the conducting portion contacting the first electrode layer and the second electrode layer according to a second embodiment of the present invention.

As for the button mechanism of the present invention, shapes of the first electrode layer and the second electrode layer are not limited to the above-mentioned embodiment, and other embodiments are introduced as follows. Please refer to FIG. 5. FIG. 5 is a diagram of the conducting portion 56 contacting a first electrode layer 46a and a second electrode layer 50a according to a second embodiment of the present invention. Difference between the first embodiment and the second embodiment is that the first section and the second section of the first electrode layer 46a are formed as an arc section, and the third section and the fourth section of the second electrode layer 50a are formed as an arc section. Two turning portions 521a of the predetermined interval can respectively be an arc turning portion. In the embodiment, an S-typed predetermined interval is composed of the two turning portions 521a.

Figure 6:
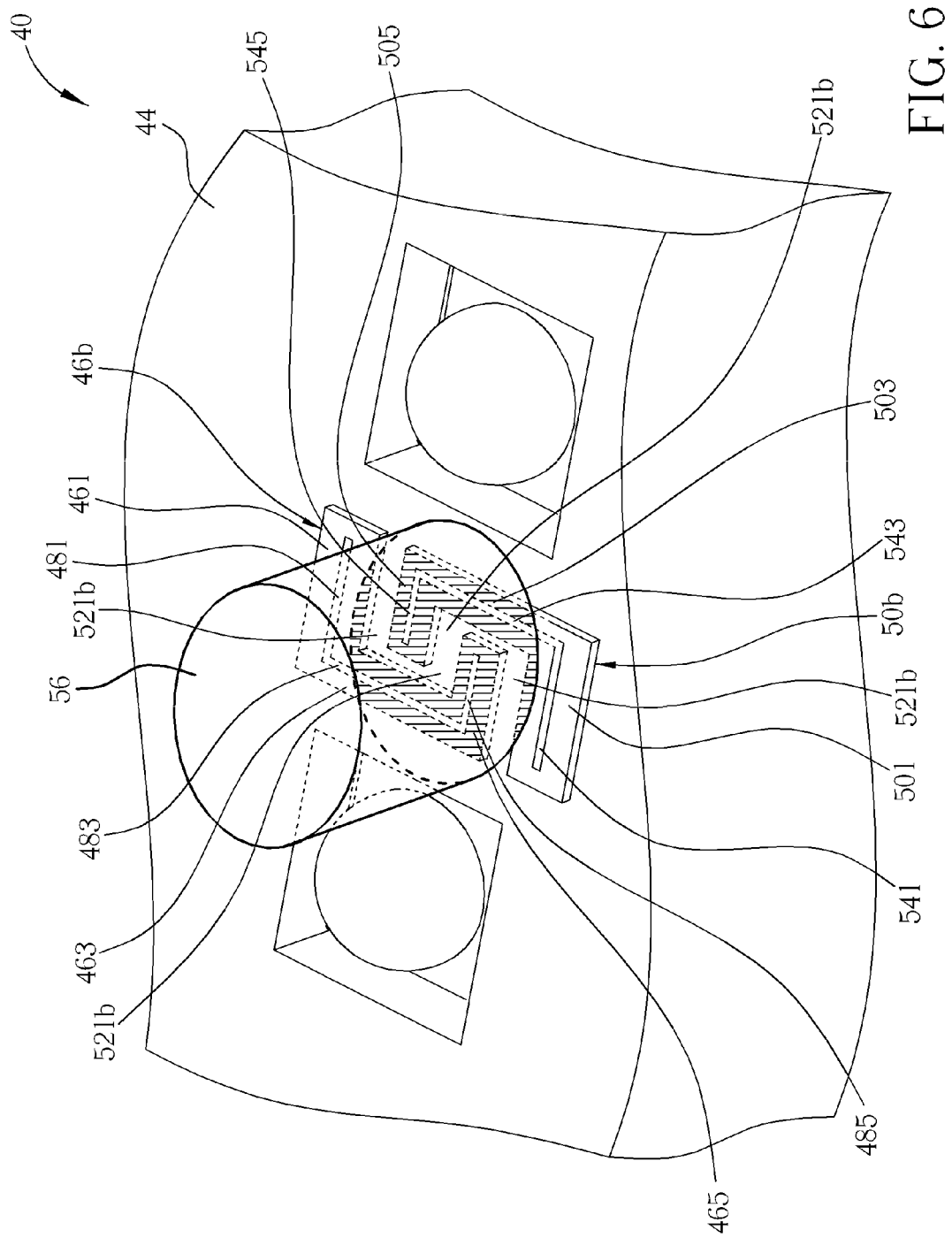
FIG. 6 is a diagram of the conducting portion contacting the first electrode layer and the second electrode layer according to a third embodiment of the present invention.

Please refer to FIG. 6. FIG. 6 is a diagram of the conducting portion 56 contacting a first electrode layer 46b and a second electrode layer 50b according to a third embodiment of the present invention. Difference between the first embodiment, the second embodiment and the third embodiment is that the first electrode layer 46b further includes a fifth section 465, and the fifth section 465 is substantially parallel to the first section 461 and points to the fourth section 503 of the second electrode layer 50. The second electrode layer 50b further includes a sixth section 505, and the sixth section 505 is substantially parallel to the third section 501 and points to the second section 463 of the first electrode layer 46.

In addition, the first bridging layer 48 and the second bridging layer 54 further include a fifth part 485 and a sixth part 545, respectively. The fifth part 485 of the first bridging layer 48 and the sixth part 545 of the second bridging layer 54 are respectively disposed between the fifth section 465, the sixth section 505, and the substrate 44, so as to enhance adhesion of the electrode layer on the substrate 44.

In the third embodiment, the first electrode layer 46b and the second electrode layer 50b of the circuit structure are respectively U-typed electrode layers. The predetermined interval between the first electrode layer 46b and the second electrode layer 50b includes four turning portions 521b.

It should be mentioned that shapes of the first electrode layer and the second electrode layer of the button mechanism of the present invention are not limited to the above-mentioned embodiment. For example, the shapes of the first electrode layer and the second electrode layer can be trapezoids, hooks and so on.

In conclusion, the button mechanism and the electronic device of the present invention can guide the light emitted from the at least one lighting unit to the casing. The circuit structure of the button mechanism has small size that not only economizes disposal space of the substrate, but also conforms to design specification of the substrate, the electrode layers and the bridging layers. Thus, the actuating structure and the two electrode layers of the button mechanism can have effective contacting areas for decreasing contact impedance and for preferable conductive reliability.

Those skilled in the art will readily observe that numerous modifications and alterations of the device and method may be made while retaining the teachings of the invention.

What is claimed is:

1. A button mechanism comprising:
   a circuit structure comprising:
      a substrate;
      a first electrode layer disposed on the substrate, the first electrode layer comprising:
         a first section; and
         a second section, a first end of the second section being connected to a first end of the first section, wherein the second section comprises a first head side, a first inner side and a first outer side, the first inner side and the first outer side are respectively connected to opposite ends of the first head side; and
      a second electrode layer disposed on the substrate and separating from the first electrode layer, the second electrode layer comprising:
         a third section, a second end of the second section pointing to a first end of the third section; and
         a fourth section, a first end of the fourth section being connected to a second end of the third section, a second end of the fourth section pointing to a second end of the first section, wherein a predetermined interval is formed between the first electrode layer and the second electrode layer, and the predetermined interval comprises a plurality of turning portions, wherein the first head side and the first inner side are adjacent to the second electrode layer, and the first outer side does not face any electrode layer, the fourth section comprises a second head side, a second inner side and a second outer side, the second inner side and the second outer side are respectively connected to opposite ends of the second head side, the second head side and the second inner side are adjacent to the first electrode layer, and the second outer side does not face any electrode layer; and
   an actuating structure, the actuating structure comprising a conductive portion, the conductive portion being for contacting the first electrode layer and the second electrode layer so as to electrically connect the first electrode layer to the second electrode layer.

2. The button mechanism of claim 1, wherein the plurality of turning portions has two turning portions.

3. The button mechanism of claim 2, wherein the first section is substantially perpendicular to the second section, so that each of the plurality of turning portions is a right-angle turning portion, and a width of the predetermined interval is substantially between 0.1 mm and 0.4 mm.

4. The button mechanism of claim 3, wherein the button mechanism further comprises at least one lighting unit, the at least one lighting unit is disposed on the substrate, the actuating structure further comprises at least one light guiding portion, and the at least one light guiding portion guides light emitted from the at least one lighting unit.

5. The button mechanism of claim 1, wherein a width of the predetermined interval is substantially between 0.1 mm and 0.4 mm.

6. The button mechanism of claim 1, wherein the circuit structure further comprises:
   a first bridging layer disposed between the substrate and the first electrode layer, the first bridging layer being for enhancing adhesion of the first electrode layer on the substrate; and
   a second bridging layer disposed between the substrate and the second electrode layer, the second bridging layer being for enhancing adhesion of the second electrode layer on the substrate.

7. The button mechanism of claim 1, wherein the first section is substantially perpendicular to the second section.

8. The button mechanism of claim 1, wherein each of the plurality of turning portions is a right-angle turning portion.

9. The button mechanism of claim 1, wherein each of the plurality of turning portions is an arc turning portion.

10. The button mechanism of claim 1, wherein a length of the first electrode layer is substantially less than 3 mm, and a width of the first electrode layer is substantially less than 1.5 mm.

11. An electronic device comprising:
   a casing;
   a button mechanism disposed inside the casing, the button mechanism comprising:
      a circuit structure comprising:
         a substrate;
         a first electrode layer disposed on the substrate, the first electrode layer comprising:
            a first section; and
            a second section, a first end of the second section being connected to a first end of the first section, wherein the second section comprises a first head side, a first inner side and a first outer side, the first inner side and the first outer side are respectively connected to opposite ends of the first head side; and
         a second electrode layer disposed on the substrate and separating from the first electrode layer, the second electrode layer comprising:
            a third section, a second end of the second section pointing to a first end of the third section; and
            a fourth section, a first end of the fourth section being connected to a second end of the third section, a second end of the fourth section pointing to a second end of the first section, wherein a predetermined interval is formed between the first electrode layer and the second electrode layer, and the predetermined interval comprises a plurality of turning portions, wherein the first head side and the first inner side are adjacent to the second electrode layer, the first outer side does not face any electrode layer, the fourth section comprises a second head side, a second inner side and a second outer side, the second inner side and the second outer side are respectively connected to opposite ends of the second head side, the second head side and the second inner side are adjacent to the first electrode layer, and the second outer side does not face any electrode layer; and
      an actuating structure, the actuating structure comprising a conductive portion, the conductive portion being for contacting the first electrode layer and the second electrode layer so as to electrically connect the first electrode layer to the second electrode layer; and
   at least one lighting unit disposed on the substrate, the at least one lighting unit emitting light toward the actuating structure.

12. The electronic device of claim 11, wherein the predetermined interval comprises two turning portions, and a width of the predetermined interval is substantially between 0.1 mm and 0.4 mm.

13. The electronic device of claim 11, wherein a length of the first electrode layer is substantially less than 3 mm, and a width of the first electrode layer is substantially less than 1.5 mm.

14. The electronic device of claim 11, wherein the actuating structure further comprises at least one light guiding portion, and the at least one light guiding portion guides light emitted from the at least one lighting unit.

15. The electronic device of claim 14, wherein the at least one lighting unit has two lighting units, the at least one light guiding portion has two light guiding portions, and the two light guiding portions respectively guide light emitted from the two lighting units.

16. The electronic device of claim 11, wherein the circuit structure comprises:
   a first bridging layer disposed between the substrate and the first electrode layer, the first bridging layer being for enhancing adhesion of the first electrode layer on the substrate; and
   a second bridging layer disposed between the substrate and the second electrode layer, the second bridging layer being for enhancing adhesion of the second electrode layer on the substrate.

17. The electronic device of claim 11, wherein the first section is substantially perpendicular to the second section, and the turning portion of the predetermined interval is a right-angle turning portion.

18. The electronic device of claim 11, wherein each of the plurality of turning portions is an arc turning portion.

* * * * *